(12) United States Patent
Camardello et al.

(10) Patent No.: US 9,890,328 B2
(45) Date of Patent: *Feb. 13, 2018

(54) PHOSPHOR COMPOSITIONS AND LIGHTING APPARATUS THEREOF

(71) Applicant: General Electric Company, Schenectady, NY (US)

(72) Inventors: Samuel Joseph Camardello, Latham, NY (US); Alok Mani Srivastava, Niskayuna, NY (US); Fangming Du, Hudson, OH (US); Holly Ann Comanzo, Niskayuna, NY (US); William Winder Beers, Chesterland, OH (US); William Erwin Cohen, Solon, OH (US)

(73) Assignee: General Electric Company, Niskayuna, NY (US)

( * ) Notice: Subject to any disclaimer, the term of this patent is extended or adjusted under 35 U.S.C. 154(b) by 227 days.

This patent is subject to a terminal disclaimer.

(21) Appl. No.: 14/747,174

(22) Filed: Jun. 23, 2015

(65) Prior Publication Data

US 2016/0168457 A1    Jun. 16, 2016

Related U.S. Application Data

(63) Continuation-in-part of application No. 14/568,170, filed on Dec. 12, 2014, now Pat. No. 9,537,061.

(51) Int. Cl.
*C09K 11/77* (2006.01)
*C09K 11/61* (2006.01)
(Continued)

(52) U.S. Cl.
CPC ........ *C09K 11/617* (2013.01); *C09K 11/7734* (2013.01); *F21K 9/64* (2016.08);
(Continued)

(58) Field of Classification Search
CPC .............. C09K 11/7734; C09K 11/666; C09K 11/7733; C09K 11/61; C09K 11/615;
(Continued)

(56) References Cited

U.S. PATENT DOCUMENTS 5,140,163 A  *  8/1992  Tecotzky ........... C09K 11/7721
                                                                  250/484.4
6,965,193 B2     11/2005  Srivastava et al.
(Continued)

FOREIGN PATENT DOCUMENTS

CN     102391859 A      3/2012
CN     102660262 A      9/2012
(Continued)

OTHER PUBLICATIONS

Machine translation of KR101443459A1, printed Mar. 29, 2017, 29 pages.*
(Continued)

*Primary Examiner* — Matthew E Hoban
*Assistant Examiner* — Lynne Edmondson
(74) *Attorney, Agent, or Firm* — Nitin N. Joshi

(57) ABSTRACT

A lighting apparatus that includes a light source and a phosphor composition radiationally coupled to the light source is presented. The phosphor composition includes a first phosphor that includes a phase of general formula (I):

$$L_3ZO_4(Br_{2-n}X_n):Eu^{2+}$$

wherein $0 \leq n \leq 1$; L is Zn, Mg, Ca, Sr, Ba, or combinations thereof; Z is Si, Ge, or a combination thereof; and X is F, Cl, I, or combinations thereof.

20 Claims, 4 Drawing Sheets

(51) Int. Cl.
    *C09K 11/66* (2006.01)
    *G02F 1/1335* (2006.01)
    *F21K 9/64* (2016.01)
    *F21Y 115/10* (2016.01)

(52) U.S. Cl.
    CPC .......... *G02F 1/1336* (2013.01); *F21Y 2115/10* (2016.08); *G02F 2001/133614* (2013.01)

(58) Field of Classification Search
    CPC . C09K 11/617; C09K 11/663; C09K 11/7791; C09K 11/7793; C09K 11/777; C09K 11/7705; H01L 33/502; F21V 9/16
    USPC ...... 252/301.4 F, 301.4 R, 301.4 H; 313/503
    See application file for complete search history.

(56) References Cited

U.S. PATENT DOCUMENTS

| | | |
|---|---|---|
| 7,311,858 B2 | 12/2007 | Wang et al. |
| 7,358,542 B2 | 4/2008 | Radkov et al. |
| 7,497,973 B2 | 3/2009 | Radkov et al. |
| 7,648,649 B2 | 1/2010 | Radkov et al. |
| 7,655,156 B2 | 2/2010 | Cheng et al. |
| 7,713,442 B2 | 5/2010 | Tian et al. |
| 7,859,182 B2 | 12/2010 | Radkov et al. |
| 7,883,226 B2 | 2/2011 | Li |
| 7,922,937 B2 | 4/2011 | Li et al. |
| 8,030,839 B2 | 10/2011 | Hosokawa et al. |
| 8,277,687 B2 | 10/2012 | Takahashi et al. |
| 8,517,551 B2 | 8/2013 | Tsukahara et al. |
| 8,703,016 B2 | 4/2014 | Nammalwar et al. |
| 8,710,487 B2 | 4/2014 | Lyons et al. |
| 9,537,061 B2 * | 1/2017 | Srivastava ............ H01L 33/504 |
| 2007/0125982 A1 | 6/2007 | Tian et al. |
| 2007/0267960 A1 * | 11/2007 | Raukas ............... C09K 11/0883 313/485 |
| 2010/0142189 A1 * | 6/2010 | Hong .................. C09K 11/616 362/97.3 |
| 2012/0068591 A1 * | 3/2012 | Kim .................. C09K 11/0883 313/484 |
| 2013/0026905 A1 | 1/2013 | Du et al. |
| 2013/0076228 A1 | 3/2013 | Du et al. |
| 2014/0035455 A1 | 2/2014 | Galvez et al. |
| 2014/0264418 A1 | 9/2014 | Murphy et al. |

FOREIGN PATENT DOCUMENTS

| | | | |
|---|---|---|---|
| KR | 101434459 A * | 8/2014 | |
| KR | 101434459 B1 | 8/2014 | |
| WO | WO 2009099211 A1 * | 8/2009 | ........... C09K 11/616 |
| WO | 2013137435 A1 | 9/2013 | |

OTHER PUBLICATIONS

Zhou et al.,"Grid-connected and islanded operation of a hybrid power system", IEEE PES PowerAfrica 2007 Conference and Exposition, Johannesburg, South Africa, Jul. 16-20, 2007, 6 Pages.

Liu et al.,"A Hybrid AC/DC Microgrid and Its Coordination Control", IEEE Transactions on Smart Grid,Vol. 2, No. 2, Jun. 2011, 9 Pages.

Brinkley et al., "Robust thermal performance of Sr2Si5N8:Eu2+: An efficient red emitting phosphor for light emitting diode based white lighting", Applied Physics Letters, IEEE Xplore, vol. 99, Issue: 24, Dec. 2011, pp. 241106-241106-3.

Wang et al., "Preparation and luminescence characteristics of Eu-doped calcium chloride silicate Ca7Si2O8Cl6", Journal of Alloys and Compounds, Science Direct, vol. 589, Mar. 15, 2014, pp. 120-124.

Zhiguo Xia, et al., "Crystal growth of CaSiOBr: New Photoluminescence Bromosilicate Host", Journal of Crystal Growth, vol. No. 318, Issue No. 1, pp. 958-961, Oct. 27, 2010.

International Search Report and Written Opinion issued in connection with corresponding PCT Application No. PCT/US2016/033890 dated Jul. 26, 2016.

Alok Mani Srivastava, et al., U.S. Appl. No. 14/568,170, filed Dec. 12, 2014.

* cited by examiner

PHOSPHOR COMPOSITIONS AND LIGHTING APPARATUS THEREOF

CROSS REFERENCE TO RELATED APPLICATION

This application is a continuation-in-part of U.S. patent application Ser. No. 14/568,170, entitled "PHOSPHOR COMPOSITIONS AND LIGHTING APPARATUS THEREOF," filed on 12 Dec. 2014, which is incorporated herein by reference in its entirety.

BACKGROUND

The invention relates generally to phosphor compositions applicable to lighting systems. The invention also relates to lighting apparatus employing these phosphors and blends thereof.

Generation of "white light" is currently achieved by so called "white light emitting diodes (white LEDs)" that are constituted by employing a near-ultraviolet (UV) or blue emitting LED in conjunction with a phosphor or a blend of phosphors. Red-emitting phosphors based on complex fluoride materials activated by $Mn^{4+}$, such as those described in U.S. Pat. No. 7,358,542, U.S. Pat. No. 7,497,973, and U.S. Pat. No. 7,648,649, absorb blue light strongly, and efficiently emit between about 610 nanometers and 635 nanometers with little deep red/NIR emission. Thus, the luminous efficacy and the quantum efficiency of white LEDs maximizes under blue excitation (440 nanometers-460 nanometers) as compared to other available red phosphors.

These complex fluorides can be utilized in combination with yellow-green emitting phosphors such as cerium-doped yttrium aluminum garnet $Y_3Al_5O_{12}:Ce^{3+}$ (YAG) or other garnet compositions to achieve warm white light (CCTs<5000 K on the blackbody locus, color rendering index (CRI)>80) from a blue LED, equivalent to that produced by current fluorescent, incandescent and halogen lamps. YAG has been mostly used in these white LED systems because of its broad emission spectrum that peaks in the yellow spectral region, and the high quantum efficiency of the LED system under blue light excitation. The drawback of YAG based LED systems is the relatively poor color rendering properties and high color temperature (CCT). For example, when an object is illuminated under such currently used white LEDs, they cannot imitate the colors illuminated by natural light.

Therefore, there is a need for phosphor compositions and blends that efficiently absorb blue radiation, provide high quantum efficiency, and result in improved color rendering in white light emitting lighting devices.

BRIEF DESCRIPTION

Briefly, most of the embodiments of the present invention provide a phosphor composition including a first phosphor that includes a phase of general formula (I),

$$L_3ZO_4(Br_{2-n}X_n):Eu^{2+} \qquad (I)$$

where $0 \le n \le 1$; L is Zn, Mg, Ca, Sr, Ba, or combinations thereof; Z is Si, Ge, or a combination thereof; and X is F, Cl, I, or combinations thereof. Some embodiments relate to a lighting apparatus that includes a light source and the phosphor composition radiationally coupled to the light source.

In some embodiments, a phosphor composition includes a first phosphor having a phase of general formula: $L_3ZO_4Br_2:Eu^{2+}$, a phase of general formula: $L_9Z_3O_{12}Br_6:Eu^{2+}$, a phase of general formula: $L_5Z_2O_7Br_4:Eu^{2+}$, or combinations of two or more of these phases, where L is Zn, Mg, Ca, Sr, Ba, or combinations thereof; and Z is Si, Ge, or a combination thereof.

Some embodiments provide a phosphor composition that includes a first phosphor including a phase of general formula: $L_3ZO_4Br_2:Eu^{2+}$, where L is Zn, Mg, Ca, Sr, Ba, or combinations thereof; and Z is Si, Ge, or a combination thereof; and a second phosphor including $K_2SiF_6:Mn^{4+}$. A ratio of a spectral weight of the phase of general formula $L_3ZO_4Br_2:Eu^{2+}$ to a spectral weight of the second phosphor is in a range from about 1:5 to about 5:1.

DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Figure 1:
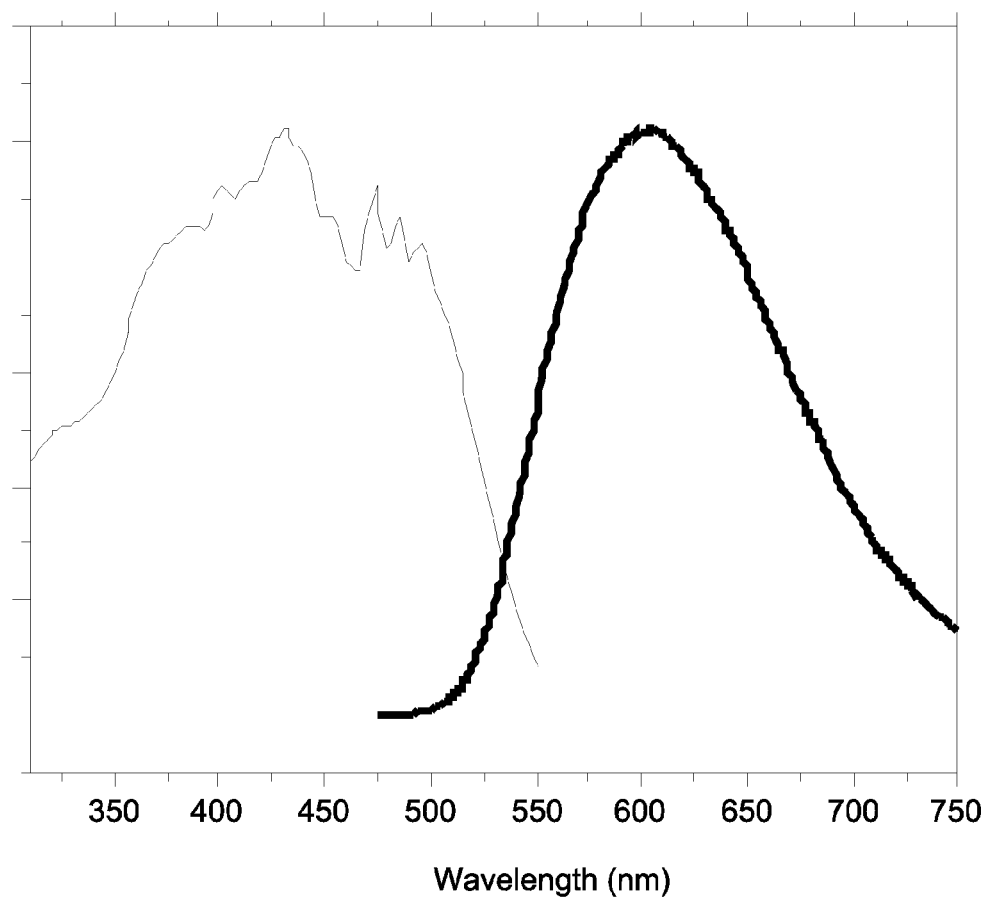
FIG. 1 shows excitation and emission spectra of a phase of a first phosphor, in accordance with one embodiment of the invention.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

Unless defined otherwise, technical and scientific terms used herein have the same meaning as is commonly understood by one of skill in the art to which this invention belongs. The terms "comprising," "including," and "having" are intended to be inclusive, and mean that there may be additional elements other than the listed elements. The terms "first", "second", and the like, as used herein do not denote any order, quantity, or importance, but rather are used to distinguish one element from another. In the following specification and the claims that follow, the singular forms "a", "an" and "the" include plural referents unless the context clearly dictates otherwise.

As used herein, the terms "phosphor", "phosphor material" or "phosphor composition" may be used to denote both a single phosphor as well as blends of two or more phosphors. As used herein, the term "phase" refers to a material or a portion of material (for example, phosphor) having a crystal structure or stoichiometry uniform throughout the material or the portion of the material, and distinct from other materials or portions. In some embodiments, the phase of the material has substantially uniform properties throughout the material or the portion of material, which are often distinct from other phases. As used herein, the terms "lamp", "lighting apparatus" or "lighting system" refer to any source of visible and ultraviolet light, which can be generated by at least one light emitting element producing a light emission when energized, for example, a phosphor or a light emitting diode.

The terms "substitution" and "doping" refer to addition of an element or atom in a material. The added element or atom may partially or completely replace another element or atom in the material. It should be noted that phosphors described herein may be denoted by a formula, for example, $L_3ZO_4Br_2$:$Eu^{2+}$. As understood by those skilled in the art, this type of notation means that the phosphor includes the composition $L_{3-a}Eu_aSiO_4Br_2$, where 'Eu' has been doped into the composition in an amount 'a' that can vary from 0.0 to 0.5. The element 'Eu' is referred to as a 'dopant' or an 'activator.' The terms "activator" or "activator ion", as used herein, refers to an ion (for example $Eu^{2+}$) doped in a phosphor composition that forms luminescent center and is responsible for the luminescence of the phosphor.

Each of the general formulae listed herein is independent of every other general formula listed. Specifically, x, y, z, a, n and other variables that may be used as numeric placeholders in a formula are not related to any usage of x, y, z, a, n and other variables that may be found in other formulas or compositions.

The phosphor compositions and blends are described herein, in conjunction with techniques and apparatus converting LED-generated ultraviolet (UV), violet, or blue radiation into a desired color light or white light, for general illumination or other purposes. It should be appreciated, however, that the invention is also applicable to the conversion of radiation from ultra violet (UV), violet, or blue lasers, as well as other light sources, to white light.

Some embodiments of the present invention are directed to a phosphor composition including a first phosphor having a phase of general formula (I): $L_3ZO_4(Br_{2-n}X_n)$:$Eu^{2+}$, where L is Zn, Mg, Ca, Sr, Ba, or combinations thereof; Z is Si, Ge or a combination thereof; X is F, Cl, I or combinations thereof; and 0≤n≤1. In some embodiments, the first phosphor includes a phase of general formula $L_3ZO_4Br_2$:$Eu^{2+}$. The phase of general formula (I) may further include manganese, tin, chromium, bismuth, lead, antimony, lanthanide elements, or combinations thereof. In particular embodiments, L is Sr, and Z is Si. In these embodiments, the first phosphor includes a phase of formula $Sr_3SiO_4Br_2$:$Eu^{2+}$. The phase of formula $Sr_3SiO_4Br_2$:$Eu^{2+}$ has a monoclinic crystal structure.

FIG. 1 shows the excitation-emission spectra of the phosphor phase of formula $Sr_3SiO_4Br_2$:$Eu^{2+}$ upon UV excitation. The monoclinic phase of formula $Sr_3SiO_4Br_2$:$Eu^{2+}$ is a red-emitting phosphor, which generates a broad emission band centered at 615 nanometers upon ultra violet (UV) excitation, as shown in FIG. 1. This monoclinic phase of formula $Sr_3SiO_4Br_2$:$Eu^{2+}$ is chemically stable and provides a low color temperature (CCT). This red-emitting phosphor $Sr_3SiO_4Br_2$:$Eu^{2+}$ may be deployed alone, or may be mixed with one or more other phosphor, for example, a yellow-green emitting phosphor for generating white light.

In some embodiments, the first phosphor further includes an additional phase of general formula (II): $L_9Z_3O_{12}(Br_{6-n}X_n)$:$Eu^{2+}$, general formula (III): $L_5Z_2O_7(Br_{4-n}X_n)$:$Eu^{2+}$, or a combination thereof; wherein 0≤n≤1; L is Zn, Mg, Ca, Sr, Ba, or combinations thereof; Z is Si, Ge or a combination thereof; and X is F, Cl, I or combinations thereof. The additional phase may further include manganese, tin, chromium, bismuth, lead, antimony, lanthanide elements, or combinations thereof. In one embodiment, the first phosphor consists essentially of the phase of formula (I).

Figure 2:
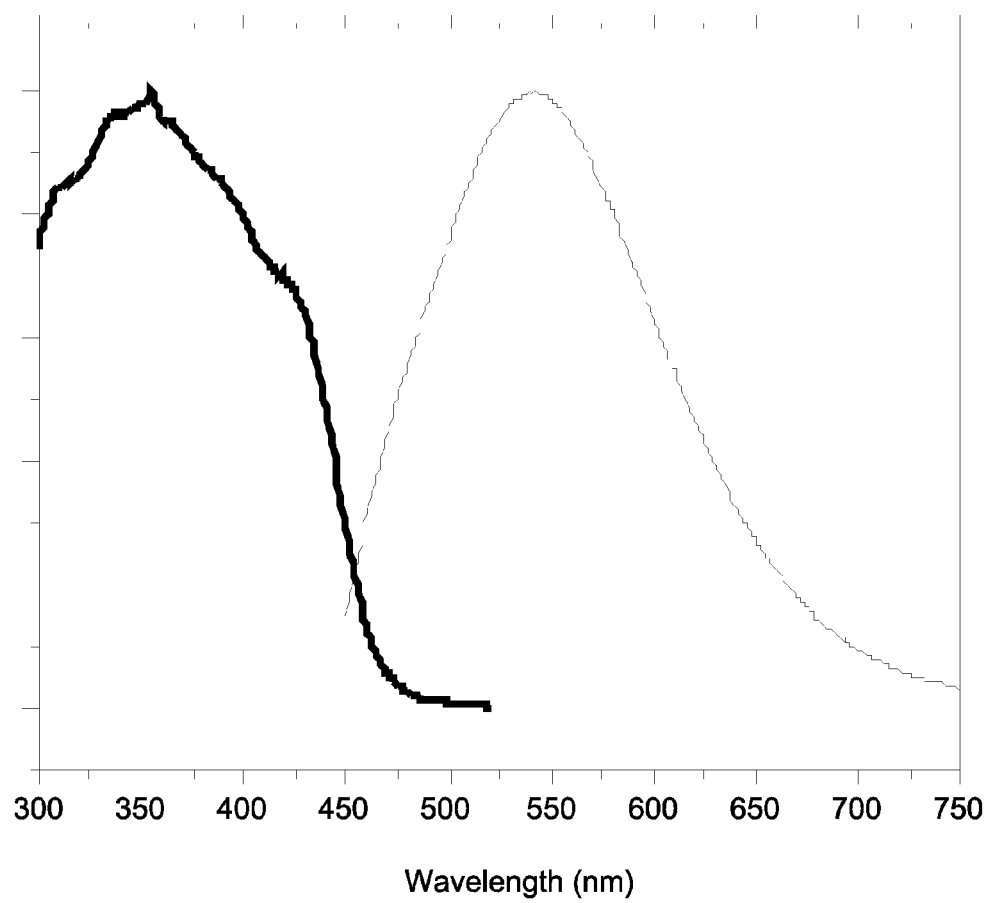
FIG. 2 shows excitation and emission spectra of an additional phase of the first phosphor, in accordance with one embodiment of the invention.

In some embodiments, the first phosphor includes the additional phase having a formula $Sr_9Si_3O_{12}Br_6$:$Eu^{2+}$. This phase of formula $Sr_9Si_3O_{12}Br_6$:$Eu^{2+}$ is chemically stable, and has a triclinic crystal structure. FIG. 2 shows the excitation-emission spectrum of the phosphor phase of formula $Sr_9Si_3O_{12}Br_6$:$Eu^{2+}$ upon UV excitation. This phase is a green-emitting phosphor that generates a broad emission band centered at 550 nanometers upon UV excitation, as shown in FIG. 2.

In some embodiments, the first phosphor includes the additional phase having a general formula $L_5Si_2O_7Br_4$:$Eu^{2+}$. L is as described above. This additional phase of general formula $L_5Si_2O_7Br_4$:$Eu^{2+}$ may produce a color-tunable emission spectrum, which may be useful for down-converting the blue radiation of the LED devices to, for example, green or orange-red radiation. That is, the $Eu^{2+}$ emission wavelength of the phosphor of general formula $L_5Si_2O_7Br_4$:$Eu^{2+}$ may be tuned from green to red emission. For example, the emission color may be tuned from green to red by substituting $Ca^{2+}$ or $Ba^{2+}$ for $Sr^{2+}$, due to the change in crystal fields. The crystal fields may be changed both by cationic and anionic substitutions.

Figure 3:
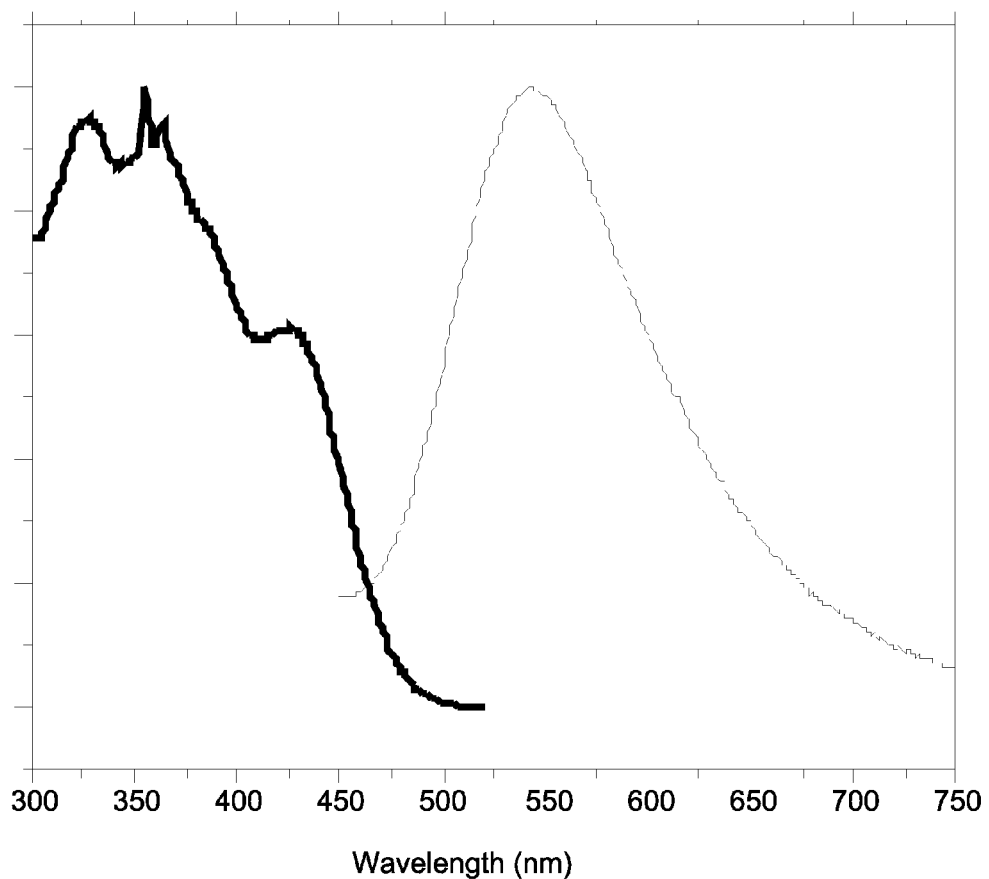
FIG. 3 shows excitation and emission spectra of an additional phase of the first phosphor, in accordance with another embodiment of the invention.

In some embodiments, the emission band of the additional phase of general formula $L_5Si_2O_7Br_4$:$Eu^{2+}$ exists in a wavelength range from about 590 nanometers to about 620 nanometers. In some other embodiments, the emission band of this addition phase exists in a wavelength range from about 515 nanometers to about 580 nanometers. For example, the excitation-emission spectrum of the phosphor phase of formula $Sr_5Si_2O_7Br_4$:$Eu^{2+}$ upon UV excitation, is illustrated in FIG. 3. The phosphor phase $Sr_5Si_2O_7Br_4$:$Eu^{2+}$ shows a peak emission near 550 nanometers.

These additional phosphor phases may be synthesized individually depending on the processing conditions. These green-emitting phosphors of formula $Sr_9Si_3O_{12}Br_6$:$Eu^{2+}$ and $Sr_5Si_2O_7Br_4$:$Eu^{2+}$ may be used alone or in combination with one or more other phosphors, for example, yellow- and/or red-emitting phosphors for generating a white light. These phosphors may be utilized in conjunction with, for example, a highly efficient GaN-based near-UV or blue-emitting LED, and form a color gamut.

The emission spectra of the additional phosphor phases, for example, $Sr_9Si_3O_{12}Br_6$:$Eu^{2+}$ and $Sr_5Si_2O_7Br_4$:$Eu^{2+}$ are depressed in the yellow region and shifted towards the blue region as compared to the conventional garnet phosphors (for example, yttrium aluminum garnet-YAG). The emission of each of these phosphors is such that each of these may replace the standard YAG phosphor that is generally applied in blue LED devices.

These green-emitting phosphor phases in combination with a red emitting phosphor (for example, a phosphor of general formula IV described later) produce white light with improved color rendering properties as compared to that often achieved using conventional garnet phosphors, when employed in the LED-based lighting systems/devices. A deficiency in the yellow region of these phosphors leads to increased red-green color contrast (or enhanced red-green separation) when objects are viewed under these LED lighting systems/devices in comparison to white LEDs that employ conventional yellow-green garnets. In some embodiments, an improvement in red-green contrast of a blend employing the green-emitting phosphor phases is at least about 5 percent, based on the red-green contrast of a blend including conventional garnet. In some specific embodiments, the improvement in red-green contrast is at least about 10 percent. Additionally, the blue-shifted green emission of these phosphor phases provides additional advantage to a color blind human when used for green light emitting devices, for example in traffic lights and backlights.

In some embodiments, the $Si^{4+}$ (Z site) of the host lattice of one or more phases of the first phosphor is partially or completely replaced by $Ge^{4+}$ or any other cation with valence of $4^+$. This may allow for tuning the spectrum obtained from the first phosphor. In one embodiment, the $Si^{4+}$ of the host lattice is completely replaced by $Ge^{4+}$, wherein the emission from the host lattice changes. However, the quantum efficacy still remains the same as that for $Si^{4+}$. In addition, Br may be partially or fully substituted with an additional halogen, such as F, Cl, I, or combinations thereof.

Each phase of the first phosphor having general formula (I), (II) and (III) may be doped with an additional activator ion. That is, the activator ion "$Eu^{2+}$" may be partially substituted with one or more additional activator ions. Examples of the additional activator ions include $Mn^{2+}$, $Mn^{4+}$, $Ce^{3+}$, $Sn^{2+}$, $Bi^{3+}$, $Sb^{3+}$, $Cr^{3+}$, $Pb^{2+}$, or combinations thereof, which may be substituted on the L site.

In some embodiments, a phosphor composition is provided that includes a first phosphor including a phase of general formula: $L_3ZO_4Br_2:Eu^{2+}$, a phase of general formula: $L_9Z_3O_{12}Br_6:Eu^{2+}$, a phase of general formula: $L_5Z_2O_7Br_4:Eu^{2+}$, or a combination of two or more of these phases. In these embodiments, L is Zn, Mg, Ca, Sr, Ba, or combinations thereof; and Z is Si, Ge or a combination thereof. In some embodiments, the phosphor composition includes a phase of formula $Sr_3SiO_4Br_2:Eu^{2+}$ and a phase of formula $Sr_9Si_3O_{12}Br_6:Eu^{2+}$. In some embodiments, the phosphor composition includes a phase of formula $Sr_3SiO_4Br_2:Eu^{2+}$ and a phase of formula $Sr_5Si_2O_7Br_4:Eu^{2+}$. In some embodiments, the phosphor composition includes a phase of formula $Sr_3SiO_4Br_2:Eu^{2+}$, a phase of formula $Sr_9Si_3O_{12}Br_6:Eu^{2+}$ and a phase of formula $Sr_5Si_2O_7Br_4:Eu^{2+}$. In some embodiments, the first phosphor consists essentially of $Sr_3SiO_4Br_2:Eu^{2+}$.

The phosphors of general formulae $L_3ZO_4Br_2:Eu^{2+}$, $L_9Z_3O_{12}Br_6:Eu^{2+}$ and $L_5Z_2O_7Br_4:Eu^{2+}$ as described herein, absorb radiation in near-UV or blue region (a wavelength range between about 350 nm and about 470 nm), and emit red or green light. These phosphors may be used in a lighting apparatus to generate light suitable for general illumination and other purposes. In some embodiments, these phosphors may be used in a lighting apparatus to generate a red light or a green light for applications such as toys, traffic light, backlight, etc. In some embodiments, these phosphors may be utilized to produce white light.

Typically, red, green, and yellow emitting inorganic phosphors are utilized in conjunction with a near-UV or blue-emitting LED, for example a GaN based LED, to achieve a complete color gamut that properly renders colored objects and provides a desirable color temperature. In some embodiments, the red-emitting phosphor for example, $Sr_3SiO_4Br_2:Eu^{2+}$ is combined with green-emitting phosphors to produce a "warm" white light. The red-emitting phosphor $Sr_3SiO_4Br_2:Eu^{2+}$ and its blends in conjunction with UV and/or blue LED chips display high quantum efficiency, which may produce white-light LEDs having a high CRI at any given color temperature (CCT).

In some embodiments, the phosphor composition further includes a second phosphor that emits red light. In one embodiment, the second phosphor is a $Mn^{4+}$ doped phosphor of general formula IV: $A_2[MF_6]:Mn^{4+}$, where A is Li, Na, K, Rb, Cs, or combinations thereof; and M is Si, Ge, Sn, Ti, Zr, Al, Ga, In, Sc, Hf, Y, La, Nb, Ta, Bi, Gd, or combinations thereof.

The $Mn^{4+}$ doped phosphor of formula IV is a $Mn^{4+}$ doped complex fluoride that is a line emitter and generates red light. As used herein, the term "complex fluoride" refers to a coordination compound containing at least one coordination center, surrounded by fluoride ions acting as ligands, and charge-compensated by counter ions as necessary. For example, in the $Mn^{4+}$ doped complex fluoride of formula $K_2SiF_6:Mn^{4+}$, the coordination center is Si and the counter ion is K. Complex fluorides are occasionally written down as a combination of simple, binary fluorides but such a representation does not indicate the coordination number for the ligands around the coordination center. The square brackets (occasionally omitted for simplicity) indicate that the complex ion they encompass is a new chemical species, different from the simple fluoride ion. The activator ion ($Mn^{4+}$) also acts as a coordination center, substituting part of the centers of the host lattice, for example, Si. The host lattice (including the counter ions) may further modify the excitation and emission properties of the activator ion.

In particular embodiments, the coordination center of the complex fluoride phosphors, that is, M in formula IV, is Si, Ge, Sn, Ti, Zr, or combinations thereof. More particularly, the coordination center is Si, Ge, Ti, or combinations thereof; the counter ion, that is, A in general formula IV, is Na, K, Rb, Cs, or combinations thereof. Examples of the complex fluoride phosphors of formula IV include $K_2[SiF_6]:Mn^{4+}$, $K_2[TiF_6]:Mn^{4+}$, $K_2[SnF_6]:Mn^{4+}$, $Cs_2[TiF_6]:Mn^{4+}$, $Rb_2[TiF_6]:Mn^{4+}$, $Cs_2[SiF_6]:Mn^{4+}$, $Rb_2[SiF_6]:Mn^{4+}$, $Na_2[TiF_6]:Mn^{4+}$, $Na_2[ZrF_6]:Mn^{4+}$, or combinations thereof. In particular embodiments, the second phosphor is $K_2SiF_6:Mn^{4+}$ (manganese doped potassium fluorosilicate; PFS).

In some embodiments, the phosphor composition includes a first phosphor including a phase of general formula I and a second phosphor of formula general IV. In particular embodiments, the phosphor composition includes a phosphor $Sr_3SiO_4Br_2:Eu^{2+}$ and a complex fluoride phosphor $K_2SiF_6:Mn^{4+}$. Both the phosphors emit red light, and thus contribute to substantially same emission spectrum. Use of the phosphor $Sr_3SiO_4Br_2:Eu^{2+}$ in combination with $K_2SiF_6:Mn^{4+}$ in the phosphor composition may advantageously reduce the amount of $K_2SiF_6:Mn^{4+}$ required in the final composition while maintaining or improving the color rendering properties when compared to a phosphor composition that includes only $K_2SiF_6:Mn^{4+}$ for red emission. In these instances, the phosphor $Sr_3SiO_4Br_2$ partially replaces the complex fluoride $K_2SiF_6:Mn^{4+}$ in the composition.

The amounts (spectral weights) of both the red emitting phosphors in the phosphor composition can be optimized to achieve the desired spectral and color rendering properties at a desired color temperature. In one embodiment, a ratio of the spectral weights of the phosphor of general formula (I) to the $Mn^{4+}$ doped phosphor of general formula (IV) ranges from about 1:9 to about 9:1. In a particular embodiment, the spectral weight ratio of the phosphor $Sr_3SiO_4Br_2:Eu^{2+}$ to the complex fluoride phosphor $K_2SiF_6:Mn^{4+}$ is in a range from about 1:5 to about 5:1. "Spectral weight" is a relative amount that each phosphor in a composition contributes to the overall emission spectrum of the device. The spectral weights of all the individual phosphors and any residual bleed from the LED source should add up to 100%.

In some embodiments, the phosphor composition may further include a third phosphor to form a phosphor blend that produces white light from a lighting apparatus. For example, the phosphor blend may find application in a white light emitting LED-based device. In one embodiment, the third phosphor is a green emitting phosphor having a peak emission in a wavelength range from about 520 nanometers to about 580 nanometers. Suitable examples of the third phosphor include, but are not limited to, green emitting garnets (for example YAG), orthosilicates, beta-sialon, oxyhalides and combinations thereof. In particular embodiment, the third phosphor is $Ca_{8-x}Eu_xMg(SiO_4)_4Cl_2$ (CASI-Eu).

Some embodiments of the present disclosure advantageously provide a red emitting phosphor $Sr_3SiO_4Br_2:Eu^{2+}$ and its combination with $K_2SiF_6:Mn^{4+}$ in a phosphor composition. In some embodiments, the phosphor $Sr_3SiO_4Br_2$ is combined with the green-emitting phosphor to produce white light emitting phosphor composition. In some embodiments, a combination of $Sr_3SiO_4Br_2:Eu^{2+}$ and $K_2SiF_6:Mn^{4+}$ is blended with the green-emitting phosphor. These phosphor compositions provide a high red-green contrast. Suitable examples of the green-emitting phosphors include CASI-Eu and YAG. Table 3 shows spectral characterization results for such compositions that are described in detailed in the example section below.

The phosphors listed above are not intended to be limiting. Any other phosphors, commercial and non-commercial, that form non-reactive blends with the phosphors disclosed herein may be used in the blends, and are considered within the scope of the present disclosure. Furthermore, some additional phosphors may be used, e.g., those emitting throughout the visible spectrum region, at wavelengths substantially different from those of the phosphors described herein. These additional phosphors may be used in the blend to customize the white color of the resulting light, and to produce light sources with improved light quality.

The phosphors, as described in the above embodiments, may be produced by mixing powders of the constituent compounds and then firing the mixture under a reducing atmosphere or by any technique known in the art.

For white-light LEDs, the combination of the light from the phosphor composition and the LED chip provides a color point with corresponding color coordinates i.e., ccx and ccy on the CIE (International Commission on Illumination) chromaticity diagram, and a correlated color temperature (CCT) (may also be referred to as 'color temperature'); and its spectral distribution provides a color rendering capability (or color rendering properties), measured by the color rendering index (CRI). The color rendering index (CRI) is used to evaluate the ability to render each of 15 colors ($R_1$-$R_{15}$ values) against a standard value of 100. The general color rendering index, $R_a$, is the average of the values for $R_1$ to $R_8$. A special color rendering index, $R_9$, represents red content. As known to those skilled in the art, the relative proportions (spectral weights) of each phosphor in the phosphor composition may be adjusted, so that when their emissions are blended and employed in a lighting device or apparatus, there is produced visible light of desired light output, for example predetermined CCT and predetermined ccx and ccy values. As stated, a white light is preferably produced.

Some embodiments of the invention are directed to a lighting apparatus that includes a phosphor composition radiationally coupled to a light source. The phosphor composition includes the first phosphor or its blends as disclosed in the above embodiments. In one embodiment, the light source can be a semiconductor radiation source, for example a light emitting diode (LED) or an organic light emitting device (OLED). Radiationally coupled means that radiation from the light source is transmitted to the phosphor composition, and the phosphor composition emits radiation of a different wavelength. A combination of the light from the light source and the light emitted from the phosphor composition may be used to produce a desired color emission or white light. For example, a white light emitting LED device may be based on a blue emitting InGaN LED chip. The blue emitting LED chip may be coated with a phosphor composition to convert some of the blue radiation to a complementary color, e.g. a red emission, a green emission or a white emission.

Non-limiting examples of lighting apparatus or devices include devices for excitation by light-emitting diodes (LEDs) such as fluorescent lamps, cathode ray tubes, plasma display devices, liquid crystal displays (LCD's), UV excitation devices, such as in chromatic lamps, lamps for backlighting, liquid crystal systems, plasma screens, xenon excitation lamps, and UV excitation marking systems. The list of these devices is meant to be merely exemplary and not exhaustive.

Figure 4:
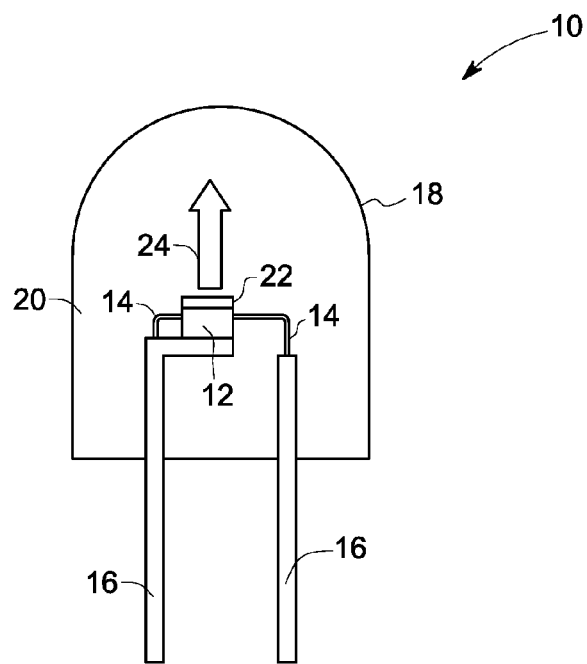
FIG. 4 is a schematic cross sectional view of a lighting apparatus, in accordance with one embodiment of the invention.

FIG. 4 illustrates a lighting apparatus or lamp 10 according to some embodiments of the present invention. The lamp 10 includes a light emitting diode (LED) chip 12, and leads 14 electrically attached to the LED chip. The leads 14 provide current to LED chip 12 and thus cause it to emit radiation. The LED chip 12 may be any semiconductor blue or ultraviolet light source, for example based on a nitride compound semiconductor of formula $In_iGa_jAl_kN$ (where $0 \le i$; $0 \le j$; $0 \le k$ and $i+j+k=1$) having an emission wavelength greater than about 250 nm and less than about 550 nm. More particularly, the chip 12 may be a near-UV or blue emitting LED having a peak emission wavelength from about 300 nm to about 500 nm. Such LEDs are known in the art. In the lighting apparatus 10, a phosphor composition (as described in the above embodiments) is disposed on a surface of the LED chip 12, and is radiationally coupled to the chip 12. The phosphor composition can be deposited on the LED 12 by any appropriate method known in the art. The light emitted by the LED chip 12 mixes with the light emitted by the phosphor composition to produce desired emission (indicated by arrow 24).

Although the general discussion of the exemplary structures of the invention discussed herein are directed toward inorganic LED based light sources, it should be understood that the LED chip may be replaced by an organic light emissive structure or other radiation source, unless otherwise noted, and that any reference to an LED chip or semiconductor is merely representative of any appropriate radiation source.

With continued reference to FIG. 4, the LED chip 12 may be encapsulated within an envelope 18, which encloses the LED chip and an encapsulant material 20. The envelope 18 may be, for example, glass or plastic. The LED chip 12 may be enclosed by the encapsulant material 20. The encapsulant material 20 may be a low temperature glass, a thermoplastic or thermoset polymer, or a suitable resin known in the art, for example, a silicone or epoxy resin. In an alternate embodiment, the lamp 10 may only include an encapsulant without an outer envelope 18.

Various structures of the lamp 10 are known in the art. For example, in some embodiments, the phosphor composition may be interspersed within the encapsulant material, instead of being disposed directly on the LED chip 12. In some other embodiments, the phosphor composition may be coated onto a surface of the envelope, instead of being formed over the LED chip. Moreover, in some embodiments, the lamp may include a plurality of LED chips. These various structures discussed with respect to FIG. 4 may be combined, with the phosphor composition located in any two or all three locations or in any other suitable location, such as separately from the envelop or integrated into the LED. Further, different phosphor compositions may be used in different parts of the structure.

In any of the above structures, the LED based lighting apparatus 10 may also include a plurality of particles (not shown) to scatter or diffuse the emitted light. These scattering particles would generally be embedded in the encapsulant 20. The scattering particles may include, for example, particles made from $Al_2O_3$ (alumina) or $TiO_2$ (titania). The scattering particles may effectively scatter the light emitted from the LED chip 12, preferably with a negligible amount of absorption.

Figure 5:
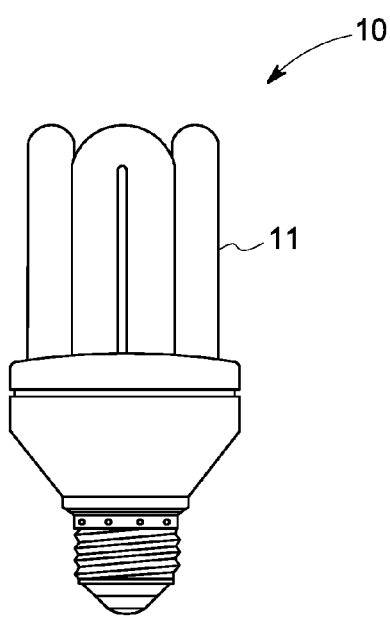
FIG. 5 is a schematic cross sectional view of a lighting apparatus, in accordance with another embodiment of the invention.

In some embodiments, the lighting apparatus can be a fluorescent lamp or a compact fluorescent lamp (CFL), in combination with a LED. For instance, a combination of a LED-generated light and a phosphor-generated light may be used to produce visible light having enhanced color contrast. In this instance, a LED can be mounted in the base of the fluorescent lamp, for example a CFL lamp. The LED can add or supplement light in select wavelength regions of the visible spectrum (such as, a portion of blue region) to the light being generated by the phosphor composition coated on a glass envelope 11 of a lamp 10 (FIG. 5).

By use of the embodiments described in the present disclosure, particularly the phosphor compositions described herein, lamps can be provided producing white light having high red-green contrast, high luminosity, and high CRI values for a low range of color temperatures of interest (2500 K to 4000 K) for general illumination.

EXAMPLES

The examples that follow are merely illustrative, and should not be construed to be any sort of limitation on the scope of the claimed invention.

The following series of examples present the synthesis of reference phosphors in accordance with some embodiments of the present invention. A comparative analysis of the characterization studies of the phosphors prepared using these synthesis methods is also presented.

Example 1 Synthesis of Phosphor Materials

Materials: High purity strontium carbonate ($SrCO_3$), silicon oxide ($SiO_2$), europium oxide ($Eu_2O_3$) (99.9%) and high purity ammonium bromide ($NH_4Br$) (98%) were used without further purification. All the raw materials were sieved through 325 mesh.

The starting materials, the weight of the reactants (in grams), and the firing temperature to make a 5 gram batch of phosphor are listed below in Table 1. In each case, 1% $Eu^{2+}$ was doped on the $Sr^{2+}$ site under the condition of 0.5% $H_2$-99.5% $N_2$ atmosphere. The weight of $SiO_2$ was adjusted for the amount of water absorbed by the powder. To form compounds of $Sr_3SiO_4Br_2$ and $Sr_9Si_3O_{12}Br_6$, the same amount of starting materials were used; the final firing temperature was different based on its transition from monoclinic to triclinic crystal form. For $Sr_9Si_3O_{12}Br_6$, 50% excess weight of $NH_4Br$ was added before the $2^{nd}$ firing.

TABLE 1

Reactants and conditions for synthesis of phosphor materials

| Phase | $SrCO_3$ (grams) | $Eu_2O_3$ (grams) | $SiO_2$ (grams) | $NH_4Br$ (grams) | $1^{st}$ fire temperature | $2^{nd}$ fire temperature |
|---|---|---|---|---|---|---|
| $Sr_3SiO_4Br_2$ | 4.2431 | 0.0511 | 0.6129 | 1.8958 | 700° C. | 750° C. |
| $Sr_9Si_3O_{12}Br_6$ | 4.2431 | 0.0511 | 0.6129 | 1.8958 | 600° C. | 650° C. |
| $Sr_5Si_2O_7Br_4$ | 3.9327 | 0.0473 | 0.6817 | 2.1085 | 800° C. | 950° C. |

The starting materials ($SrCO_3$, $SiO_2$, and $Eu_2O_3$) for synthesizing the phosphor compositions were weighed into a plastic bottle, and then blended with yttria stabilized zirconia (YSG) media in the presence of excess $NH_4Br$ and ball milled for 1 hour. Then, the blended powder was placed in an alumina crucible and fired at the "$1^{st}$ fire" temperature as noted in Table 1 for 1 hour under 0.5% $H_2$-99.5% $N_2$ atmosphere. After firing, the powder was filtered through a 60 mesh sieve and re-blended for 1 hr., and the powder was re-fired at the "$2^{nd}$ fire" temperature (Table 1) under 0.5% $H_2$-99.5% $N_2$ atmosphere. The product phosphors were collected and characterized by X-ray diffraction.

For synthesizing $Sr_3SiO_4Br_2$, $Sr_9Si_3O_{12}Br_6$ and $Sr_5Si_2O_7Br_4$ phases, the starting materials ($SrCO_3$ or $SrBr_2$), hold times (5 hrs to 10 hrs), atmosphere (0.5% $H_2$ or 1% $H_2$) or temperature may be varied to synthesize one or more of the desired phosphor phase.

Example 2 Characterization of Phosphor Materials

The product phosphors, as synthesized in example 1, were sieved through 325 mesh and were then characterized by X-ray diffraction. Powder X-ray diffraction patterns were obtained using PAN analytical diffractometer with Cu—$K_\alpha$ radiation in Bragg-Brentano geometry. The X-ray diffraction study was performed using the $K_\alpha$ line with copper (Cu) as an anticathode according to the Bragg-Brentano method. The initial samples showed bright emission and the X-ray diffraction (XRD) study determined the presence of three different phases. The determined phases were not known in the art and a Rietveld analysis was not performed as the structural similarity of the synthesized compounds with other compounds present in the database were not found.

The three new phases detected by XRD remained unidentified after extensive efforts to index the spectra. Purified powder materials for each phase were then melted and solidified to form respective single crystals to resolve the structures. After obtaining a phase of pure powder, the powder was melted in an excess of $SrBr_2$, which was used as flux. The melted powder was then cooled slowly in the furnace at 5° C./hr. rate. The excess flux material was washed with alcohol and the crystals were collected. With slow cooling, single crystals were obtained which were large enough to perform single crystal XRD and the respective phases were determined to be $Sr_3SiO_4Br_2$, $Sr_9Si_3O_{12}Br_6$ and $Sr_5Si_2O_7Br_4$.

One compound identified in the experiment described above was a monoclinic crystal phase having formula $Sr_3SiO_4Br_2$:$Eu^{2+}$, where the crystal had three unequal crystal axes with one oblique intersection in the crystal structure. An emission spectrum near 600 nm was obtained for the phosphor phase of formula $Sr_3SiO_4Br_2$:$Eu^{2+}$, as shown in FIG. 1. The $Sr_3SiO_4Br_2:Eu^{2+}$ compound showed characteristic red emission. FIG. 1 illustrates that this phosphor phase showed a broad spectrum with a peak at 590 nm upon 450 nm excitation.

Another phase identified in the experiment described above included a triclinic crystal structure having formula $Sr_9Si_3O_{12}Br_6:Eu^{2+}$, where the crystal had three unequal crystal axes intersecting at oblique angles. An emission spectrum near 550 nm was obtained for the phosphor phase having formula $Sr_9Si_3O_{12}Br_6:Eu^{2+}$, as shown in FIG. 2. FIG. 2 illustrates that this phosphor phase emits a broad spectrum with a peak at 545 nm upon 350 nm excitation.

The excitation-emission spectra of another phosphor phase of formula $Sr_5Si_2O_7Br_4:Eu^{2+}$ are illustrated in FIG. 3, where the phosphor ($Sr_5Si_2O_7Br_4:Eu^{2+}$) emits near 550 nm (as shown in FIG. 3). The narrower emission band observed for this phosphor phase suggests that the phosphor may provide higher efficacy and desired color relative to standard LED phosphors that are available commercially.

The following series of examples present the characterization of reference phosphor blends in accordance with some embodiments of the present invention. A comparative analysis of the simulation characterization and the characterization studies of the phosphor blends is also presented.

Example 3 Simulation Characterization of Phosphor Blends

Table 2 shows simulation characterization results for ten phosphor blends at 2700K. The predicted spectral weights of each phosphor are shown in the Table 2. Further, the spectral characteristics i.e., luminosity-lumen per watt (LPW), color rendering index (CRI), and $R_9$, calculated from the predicted spectra for these blends are also presented in Table 2.

TABLE 2

Simulation characterization results for phosphor blends

| PFS | BSY | $Sr_3SiO_4Br_2$ | LPW (%) | CRI | $R_9$ |
|---|---|---|---|---|---|
| 0 | 0.051 | 0.876 | 100 | 61.3 | −45.5 |
| 0.05 | 0.124 | 0.752 | 100 | 66.9 | −22.1 |
| 0.1 | 0.198 | 0.629 | 100 | 72.5 | −0.6 |
| 0.15 | 0.272 | 0.506 | 100 | 77.9 | 22.5 |
| 0.169 | 0.301 | 0.458 | 100 | 80 | 30.7 |
| 0.2 | 0.346 | 0.383 | 100 | 83.3 | 44 |
| 0.25 | 0.420 | 0.259 | 100 | 88.4 | 64.2 |
| 0.3 | 0.494 | 0.136 | 100 | 92.6 | 84.1 |

TABLE 2-continued

Simulation characterization results for phosphor blends

| PFS | BSY | $Sr_3SiO_4Br_2$ | LPW (%) | CRI | $R_9$ |
|---|---|---|---|---|---|
| 0.35 | 0.568 | 0.013 | 100 | 91.8 | 95.4 |
| 0.355 | 0.576 | 0 | 100 | 91.5 | 93.7 |

Example 4 Experimental Characterization of Phosphor Blends

Experimental phosphor blends (samples 1-7; Table 3) were prepared by combining $Sr_3SiO_4Br_2:Eu^{2+}$ (prepared as described in example 1), $K_2SiF_6:Mn^{4+}$ (PFS) and $Ca_{7.9}Eu_{0.1}Mg(SiO_4)_4Cl_2$ (CASI-Eu). The amounts (spectral weights) of constituent phosphor compositions in the blends are listed in Table 3. Each phosphor blend was individually mixed with a silicone precursor (Sylgard 184) to attain 25% loading. The mixture was degassed in a vacuum chamber for about 15 minutes. A suitable amount of the mixture was poured into a disc-shaped template (28.7 mm diameter and 0.79 mm thick) on the template, held for one hour, and baked for 30 minutes at 90° C. The samples were cut into 5×5 mm² squares for testing.

In addition, two comparative blends (samples 8-9) were prepared by combining $K_2SiF_6:Mn^{4+}$ and $Ca_{7.9}Eu_{0.1}Mg(SiO_4)_4Cl_2$ (CASI-Eu) in amounts as listed in Table 3. These comparative blends did not include $Sr_3SiO_4Br_2:Eu^{2+}$. The process for preparing the comparative blends was similar to the process used for preparing the blend samples 1-7.

All the samples (samples 1-9) were tested for their spectral characteristics. The spectral characteristics: color rendering index (CRI) and $R_a$, correlated color temperature (CCT), luminosity-lumen per watt (LPW), and ccx and ccy for the samples 1-9 are given in Table 3. These samples generate white light having good red-green contrast while maintaining high luminosity and CRI value at a low CCT i.e., between 2500K and 3000K. It is clear from Table 2 and Table 3 that the predicted spectral characteristics are approximately same to the experimental spectral characteristics.

It can be clearly observed from Table 3 that the addition of $Sr_3SiO_4Br_2:Eu^{2+}$ in the experimental blends (samples 1-7) reduces the amount of PFS required in the blends when compared to the comparative blends (samples 8-9), while maintaining good green-red contrast and high luminosity similar to that of the comparative blends, and improving CRI values as compared to the comparative blends, at a low CCT. Further, samples 4-7 having an amount of PFS reduced by more than about 50% of the amount of PSF in samples 1-3 show characteristics comparable to that of samples 1-3.

TABLE 3

Experimental characterization results for phosphor blends

| Sample blends | PFS | CASI-Eu | $Sr_3SiO_4Br_2:Eu^{2+}$ | CCT | ccx | ccy | LPW | $R_a$ | CRI |
|---|---|---|---|---|---|---|---|---|---|
| Sample 1 | 0.700 | 0.100 | 0.200 | 2775 | 0.4347 | 0.3738 | 277 | 62 | 111 |
| Sample 2 | 0.667 | 0.111 | 0.222 | 2890 | 0.4308 | 0.3791 | 282 | 66 | 115 |
| Sample 3 | 0.667 | 0.111 | 0.222 | 2918 | 0.4343 | 0.3891 | 286 | 66 | 115 |
| Sample 4 | 0.200 | 0.100 | 0.700 | 2949 | 0.4346 | 0.3934 | 304 | 86 | 91 |
| Sample 5 | 0.200 | 0.100 | 0.700 | 3027 | 0.4251 | 0.3829 | 299 | 87 | 93 |
| Sample 6 | 0.182 | 0.091 | 0.727 | 2961 | 0.4263 | 0.3780 | 297 | 85 | 90 |
| Sample 7 | 0.167 | 0.083 | 0.750 | 2830 | 0.4382 | 0.3865 | 301 | 82 | 85 |
| Sample 8 | 0.857 | 0.143 | 0 | 3183 | 0.411 | 0.369 | 265 | 21 | 53 |
| Sample 9 | 0.875 | 0.125 | 0 | 2826 | 0.427 | 0.364 | 260 | 18 | 49 |

The invention claimed is:

1. A phosphor composition comprising: a first phosphor comprising at least two phases of general formulae:

$$L_3ZO_4(Br_{2-n}X_n):Eu^{2+};\quad\text{(I)}$$

$$L_9Z_3O_{12}(Br_{6-n}X_n):Eu^{2+};\text{ or}\quad\text{(II)}$$

$$L_5Z_2O_7(Br_{4-n}X_n):Eu^{2+},\quad\text{(III)}$$

wherein 0≤n≤1; L is Zn, Mg, Ca, Sr, Ba, or combinations thereof; Z is Si, Ge, or a combination thereof; and X is F, Cl, I, or combinations thereof.

2. The phosphor composition of claim 1, wherein L is Sr, and Z is Si.

3. The phosphor composition of claim 1, wherein the phase of general formula (I) is $Sr_3SiO_4Br_2:Eu^{2+}$.

4. The phosphor composition of claim 1, wherein the phase of general formula (II) is $Sr_9Si_3O_{12}Br_6:Eu^{2+}$.

5. The phosphor composition of claim 1, wherein the phase of general formula (III) is $Sr_5Si_2O_7Br_4:Eu^{2+}$.

6. The phosphor composition of claim 1, wherein a portion of $Eu^{2+}$ in at least one phase of the first phosphor is substituted by $Mn^{2+}$, $Mn^{4+}$, $Ce^{3+}$, $Sn^{2+}$, $Bi^{3+}$, $Sb^{3+}$, $Cr^{3+}$, $Pb^{2+}$, or combinations thereof.

7. A phosphor composition comprising:
a first phosphor comprising a red-emitting phase of general formula (I)

$$L_3ZO_4(Br_{2-n}X_n):Eu^{2+}\quad\text{(I); and}$$

a red-emitting second phosphor of general formula (IV)

$$A_2[MF_6]:Mn^{4+}\quad\text{(IV),}$$

wherein 0≤n≤1, L is Zn, Mg, Ca, Sr, Ba, or combinations thereof; Z is Si, Ge, or a combination thereof; and X is F, Cl, I, or combinations thereof, A is Li, Na, K, Rb, Cs, or combinations thereof, and M is Si, Ge, Sn, Ti, Zr, Al, Ga, In, Sc, Hf, Y, La, Nb, Ta, Bi, Gd, or combinations thereof.

8. The phosphor composition of claim 7, wherein a ratio of a spectral weight of the phase of general formula (I) to a spectral weight of the second phosphor is in a range from about 1:5 to 5:1.

9. The phosphor composition of claim 7, wherein the red-emitting second phosphor of general formula (IV) is $K_2SiF_6:Mn^{4+}$.

10. The phosphor composition of claim 7, further comprising a third phosphor selected from the group consisting of an oxyhalide, garnet, orthosilicate, beta-sialon and combinations thereof.

11. The phosphor composition of claim 10, wherein the third phosphor is $Ca_{8-x}Eu_xMg(SiO_4)_4Cl_2$, where 0<x≤0.5.

12. A lighting apparatus comprising a light source and the phosphor composition according to claim 1 radiationally coupled to the light source.

13. The lighting apparatus of claim 12, wherein the light source comprises a light emitting diode (LED) device.

14. A back light apparatus comprising a light source and the phosphor composition according to claim 1 radiationally coupled to the light source.

15. A liquid crystal display apparatus, comprising a liquid crystal panel and the back-light apparatus according to claim 14 disposed on a back surface of the liquid crystal panel.

16. The phosphor composition of claim 7, wherein:
the red-emitting phase of general formula (I) is $L_3ZO_4Br_2:Eu^{2+}$, wherein L is Zn, Mg, Ca, Sr, Ba, or combinations thereof; and Z is Si, Ge, or a combination thereof; and
the red-emitting second phosphor of formula (IV) is $K_2SiF_6:Mn^{4+}$, and
wherein a ratio of a spectral weight of the phase of general formula $L_3ZO_4Br_2:Eu^{2+}$ to a spectral weight of $K_2SiF_6:Mn^{4+}$ is in a range from about 1:5 to about 5:1.

17. The phosphor composition of claim 7, wherein the red-emitting phase of formula (I) is $Sr_3SiO_4Br_2:Eu^{2+}$.

18. The phosphor composition of claim 7, wherein the first phosphor further comprises an additional phase of general formula (II), general formula (III), or a combination thereof, $$L_9Z_3O_{12}(Br_{6-n}X_n):Eu^{2+}\quad\text{(II)}$$

$$L_5Z_2O_7(Br_{4-n}X_n):Eu^{2+}\quad\text{(III)}$$

wherein 0≤n≤1; L is Zn, Mg, Ca, Sr, Ba, or combinations thereof; Z is Si, Ge, or a combination thereof; and X is F, Cl, I, or combinations thereof.

19. A phosphor composition comprising a first phosphor comprising a red-emitting phase of general formula (I)

$$L_3ZO_4(Br_{2-n}X_n):Eu^{2+}\quad\text{(I)}$$

wherein 0≤n≤1; L is Zn, Mg, Ca, Sr, Ba, or combinations thereof; Z is Si, Ge, or a combination thereof; and X is F, Cl, I, or combinations thereof.

20. The phosphor composition of claim 19, wherein the red-emitting phase of general formula (I) is $Sr_3ZO_4(Br_{2-n}X_n):Eu^{2+}$, wherein 0≤n≤1; Z is Si, Ge, or a combination thereof; and X is F, Cl, I, or combinations thereof.

* * * * *